(No Model.)

M. SAMMIS.
COMBINED CARVER AND STEEL.

No. 568,878.　　　　　　　　Patented Oct. 6, 1896.

WITNESSES

INVENTOR
Mary Sammis
BY
Edgar Tate & Co
ATTORNEYS

UNITED STATES PATENT OFFICE.

MARY SAMMIS, OF BLOOMFIELD, NEW JERSEY.

COMBINED CARVER AND STEEL.

SPECIFICATION forming part of Letters Patent No. 568,878, dated October 6, 1896.

Application filed May 27, 1896. Serial No. 593,230. (No model.)

*To all whom it may concern:*

Be it known that I, MARY SAMMIS, a citizen of the United States, and a resident of Bloomfield, in the county of Essex and State of New Jersey, have invented certain new and useful Improvements in a Combined Carver and Steel, of which the following is a specification, reference being had to the accompanying drawings, forming a part thereof, in which similar numerals of reference indicate corresponding parts.

This invention relates to carvers, and steels for sharpening the same; and the object thereof is to provide an improved combination device of this class, a further object being to provide a carver of the usual or any preferred form, which is also provided with any desired form of handle, said handle being provided with a longitudinal central passage which is adapted to receive a steel, said steel being adapted to be detachably connected with said handle.

The invention is fully disclosed in the following specification, of which the accompanying drawings form a part, in which—

Figure 1:
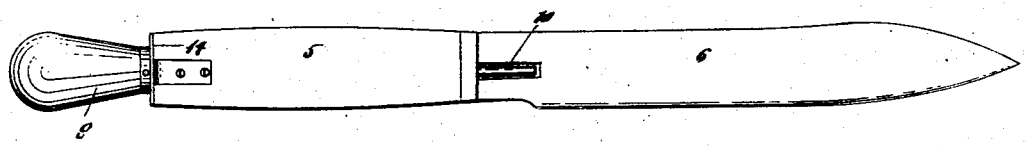
Figure 2:
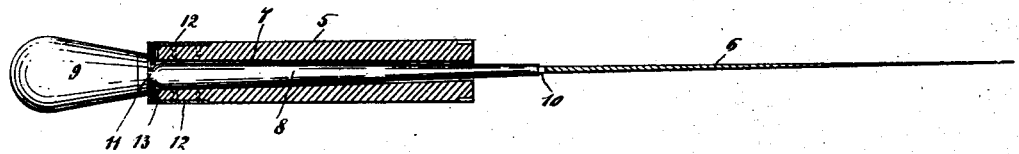

Figure 1 is a side view of my improved combination steel and carver; Fig. 2, a longitudinal central section thereof; and Fig. 3, an end view of the handle of the carver, showing the means by which the steel is held in place.

In the practice of my invention I provide a handle 5, to which is secured a carving-blade 6 of any preferred form, and the handle 5 may be of any desired shape or form in cross-section and is provided with a longitudinal passage or opening 7, which is circular in form in cross-section, and I also provide a steel 8, having a handle 9, and said steel is adapted to be passed through the central opening or passage 7 in the handle 5, and the handle end of the blade 6 is also provided with a short longitudinal slot 10 into which said steel projects.

Figure 3:
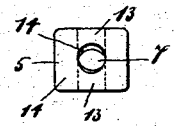

The steel 8 is provided adjacent to the handle 9 with an annular groove 11, the inner walls of which are beveled or inclined, and secured to the opposite sides of the outer end of the handle 5 are springs 12, which are provided with inwardly-directed arms 13, said arms being shown in full lines in Fig. 2 and in dotted lines in Fig. 3, and the inner ends of these arms are segmental or semicircular in form, as shown at 14 in Fig. 3, and said inner ends are adapted to engage with the annular groove 11 and to hold the steel within the handle 5. Said steel may be withdrawn against the operation of the springs 12 whenever desired by simply pulling on the handle 9, in which operation the ends of the springs 12 are forced out of the groove 11, and it will be understood that the steel may be again forced into the handle, and this operation may be repeated whenever necessary, and secured to the outer end of the handle 5 of the carver is a plate 14, which serves to strengthen said handle and to protect said springs.

This device is simple in construction and operation, and by means thereof I provide a combined steel and carver, whereby the steel and carver are always ready for use, being connected as herein described, and the necessity of hunting up the steel when it is required for use is obviated.

It is evident that changes in and modifications of the construction herein described may be made without departing from the spirit of my invention or sacrificing its advantages, and, Having fully described my invention, I claim as new and desire to secure by Letters Patent—

1. A combined carver and steel, comprising a suitable handle having a central longitudinal bore or passage formed therein, and a blade secured thereto, at one end thereof, and a steel which is adapted to be inserted through said central longitudinal bore or passage, said steel being provided with a handle and with an annular groove adjacent to said handle, and the handle of the blade being provided with springs which are adapted to enter said groove, the end of the blade adjacent to the handle being provided with a longitudinal slot into which the end of the steel projects, substantially as shown and described.

2. A combined steel and carver comprising a suitable handle, having a carving-blade secured thereto, said handle being provided with a central longitudinal passage or opening, and said blade with a slot adjacent thereto, and a steel provided with a handle, said steel being adapted to be passed through said opening or passage in the handle of the blade, and means for detachably connecting it with said handle, substantially as shown and described.

In testimony that I claim the foregoing as my invention I have signed my name, in presence of the subscribing witnesses, this 25th day of May, 1896.

MARY SAMMIS.

Witnesses:
CHARLES S. ROGERS,
C. GERST.